US012662852B2

(12) United States Patent
Schiffer et al.

(10) Patent No.: US 12,662,852 B2
(45) Date of Patent: Jun. 23, 2026

(54) MOTOR VEHICLE LOCK

(71) Applicant: Kiekert AG, Heiligenhaus (DE)

(72) Inventors: Holger Schiffer, Meerbusch (DE); Michael Scholz, Essen (DE); Cyrille Roussel, Mettmann (DE); Ömer Inan, Dorsten (DE); Peter Szegeny, Engelskirchen (DE)

(73) Assignee: Kiekert AG, Heiligenhaus (DE)

(*) Notice: Subject to any disclaimer, the term of this patent is extended or adjusted under 35 U.S.C. 154(b) by 15 days.

(21) Appl. No.: 18/864,930

(22) PCT Filed: May 3, 2023

(86) PCT No.: PCT/DE2023/100319
§ 371 (c)(1),
(2) Date: Nov. 12, 2024

(87) PCT Pub. No.: WO2023/227159
PCT Pub. Date: Nov. 30, 2023

(65) Prior Publication Data

US 2025/0314105 A1 Oct. 9, 2025

(30) Foreign Application Priority Data

May 24, 2022 (DE) ..................... 10 2022 113 045.2

(51) Int. Cl.
*E05B 77/06* (2014.01)

(52) U.S. Cl.
CPC .................................... *E05B 77/06* (2013.01)

(58) Field of Classification Search
CPC .......... E05B 77/06; E05B 77/02; E05B 77/04; E05B 77/12; E05B 2015/0486;
(Continued)

(56) References Cited

U.S. PATENT DOCUMENTS 8,303,004 B2 * 11/2012 Lee ......................... E05B 85/26 292/216
8,353,542 B2 * 1/2013 Cumbo ................... E05B 77/12 292/216
(Continued)

FOREIGN PATENT DOCUMENTS

CN 106460414 A * 2/2017 ............. E05B 77/06
DE 102008018500 A1 * 4/2009 ............. E05B 81/06
(Continued)

OTHER PUBLICATIONS

International Search Report mailed Jul. 20, 2023, for International Application No. PCT/DE2023/100319.

*Primary Examiner* — Steven A Tullia
(74) *Attorney, Agent, or Firm* — Renner, Otto, Boisselle & Sklar, LLP

(57) ABSTRACT

A motor vehicle lock, in particular a motor vehicle door lock is provided with an actuation lever chain for a locking mechanism. The actuation lever chain has at least one actuation lever and a coupling element. A mass inertia element is also produced, which acts on the coupling element at least in the event of a crash. As well as a spring acting on the mass inertia element. According to the invention, the spring is designed to be double-acting, with a crash spring part and an engaging spring part.

16 Claims, 7 Drawing Sheets

(58) Field of Classification Search
CPC .......... E05B 15/04; E05B 81/90; E05B 79/02; Y10T 292/0932
USPC .......................................................... 70/465
See application file for complete search history.

(56) References Cited

U.S. PATENT DOCUMENTS

| | | | | |
|---|---|---|---|---|
| 9,376,842 | B2 * | 6/2016 | Wittelsbuerger | E05B 77/06 |
| 9,410,345 | B2 * | 8/2016 | Uehara | E05B 77/02 |
| 9,631,404 | B2 * | 4/2017 | Takagi | E05B 77/32 |
| 9,637,952 | B2 * | 5/2017 | Wittelsbuerger | E05B 77/06 |
| 9,879,450 | B2 * | 1/2018 | Wahmann | E05B 77/06 |
| 9,920,555 | B2 * | 3/2018 | Brickner | E05B 77/12 |
| 10,400,484 | B2 * | 9/2019 | Didier | E05B 79/20 |
| 10,508,475 | B2 * | 12/2019 | Rosales | E05B 77/06 |
| 10,655,366 | B2 * | 5/2020 | Cumbo | E05B 85/20 |
| 10,858,868 | B2 * | 12/2020 | Gotzen | E05B 79/10 |
| 10,934,746 | B2 * | 3/2021 | Debroucke | E05B 77/06 |
| 11,078,689 | B2 * | 8/2021 | Graute | E05B 77/06 |
| 11,131,124 | B2 * | 9/2021 | Hunt | E05B 77/02 |
| 11,414,896 | B2 * | 8/2022 | Brickner | E05B 77/06 |
| 12,421,767 | B2 * | 9/2025 | Basavarajappa | E05B 77/12 |
| 12,523,069 | B2 * | 1/2026 | Shinohara | E05B 77/06 |
| 2012/0110920 | A1 * | 5/2012 | Takagi | E05B 85/26 292/226 |
| 2014/0284943 | A1 * | 9/2014 | Wittelsbuerger | E05B 85/243 292/92 |
| 2014/0284945 | A1 | 9/2014 | Wittelsbuerger et al. | |
| 2014/0291997 | A1 * | 10/2014 | Hunt | E05B 77/06 292/92 |
| 2015/0308161 | A1 * | 10/2015 | Rosales | E05B 77/06 292/195 |

FOREIGN PATENT DOCUMENTS

| | | | | | |
|---|---|---|---|---|---|
| DE | 202008012484 | U1 | * | 2/2010 | E05B 81/06 |
| DE | 202012002175 | U1 | * | 6/2013 | E05B 77/06 |
| DE | 102013211050 | A1 | * | 9/2014 | E05C 3/12 |
| DE | 102014104115 | A1 | * | 10/2014 | E05B 77/06 |
| DE | 102014001490 | A1 | * | 7/2015 | E05B 77/06 |
| DE | 102017102549 | A1 | | 8/2018 | |
| DE | 102017103472 | A1 | | 8/2018 | |
| DE | 102019128664 | A1 | | 4/2021 | |
| DE | 102020102084 | A1 | * | 7/2021 | E05B 77/04 |
| EP | 2636826 | A2 | | 9/2013 | |
| FR | 2003342 | A1 | * | 11/1969 | E05B 65/00 |
| WO | WO-2016058653 | A1 | * | 4/2016 | E05B 77/06 |
| WO | WO-2017005236 | A1 | * | 1/2017 | E05B 77/06 |
| WO | WO-2017036452 | A1 | * | 3/2017 | E05B 77/06 |
| WO | WO-2018149443 | A1 | * | 8/2018 | E05B 77/38 |
| WO | 2019210905 | A1 | | 11/2019 | |
| WO | WO-2020121117 | A1 | * | 6/2020 | E05B 77/06 |

* cited by examiner

MOTOR VEHICLE LOCK

This application is a national phase of International Application No. PCT/DE2023/100319 filed May 3, 2023, which claims priority to German Application No. 10 2022 113 045.2 filed May 24, 2022, each of which is hereby incorporated herein by reference in its entirety.

FIELD OF DISCLOSURE

The invention relates to a motor vehicle lock, in particular to a motor vehicle door lock, having an actuation lever chain for a locking mechanism, which has at least one actuation lever and a coupling element, having a mass inertia element which acts on the coupling element at least in the event of a crash, and having a spring acting on the mass inertia element.

BACKGROUND OF DISCLOSURE

The locking mechanism usually and substantially consists of a rotary latch and a pawl. The actuation lever chain for the locking mechanism usually ensures that after an outside or inside door handle is acted upon, the pawl is lifted from its locking engagement with the rotary latch in order to reverse the locking state of the locking mechanism. As a result, a locking bolt previously captured by the catch is released. Since the motor vehicle lock is usually located inside a motor vehicle door, this process means that the corresponding motor vehicle door can be opened. This is because the locking bolt is usually positioned on the body. However, this requires that the motor vehicle lock is generally in the "unlocked" state and the coupling element is in the "engaged" state, and consequently the actuation lever chain is mechanically closed.

In contrast, the locked state of the motor vehicle lock corresponds to the actuation lever chain being open and the coupling element being "disengaged". As a result, the mechanical connection from the previously mentioned outside door handle or inside door handle to the pawl is interrupted. As a result, operations on the inside or outside door handle have no effect on the locking mechanism.

The prior art according to DE 10 2017 102 549 A1 involves the mass inertia element ensuring that the coupling element is transferred from its engaged state to the disengaged state in the event of a crash. As a result, the actuation lever chain is necessarily mechanically interrupted. This means that the mass inertia element ensures an unlocking in the event of a crash. Any acceleration-related impacts, particularly on the outside door handle, cannot therefore lead to an unintentional opening of the motor vehicle door. This provides optimal protection for passengers in the associated motor vehicle.

For this purpose, the aforementioned prior art proceeds in such a way that the coupling element is acted upon by a control lever, which in turn interacts with the mass inertia element. In this case, the control lever is guided in a control contour of the inertia mass inertia element. This results in the forced guidance of the coupling element.

Since motor vehicles today are typically locked during operation, the problem with the known procedure is that in the event of a crash, the motor vehicle lock in question retains its locked state. This is because a crash is often associated with a power failure. As a result, for example, arriving rescue personnel are often unable to open the corresponding motor vehicle door when operating the outside door handle, even though the crash unlocking described above has taken place. This can be attributed to the fact that after the end of the crash, the coupling element was transferred from its disengaged to the engaged state. However, in this case, an additional locking lever, for example, which is still in the locked state, often ensures that the actuation lever chain remains interrupted and the locking mechanism cannot therefore be opened.

The prior art also presents other, independent solutions that make it possible to unlock an associated actuation lever chain, particularly in the event of a crash. For example, WO 2019/210905 A1 deals with a motor vehicle lock in which the unlocking and opening of the motor vehicle lock is carried out by means of a rotary movement of a driven disk. The driven disk is a component of a drive unit with a motor, wherein the motor drives the driven disk. If the power supply fails in the event of a crash, other solutions are also known that work with an emergency power source and thus still provide unlocking and opening in the event of a main power source failure.

In the generic prior art according to DE 10 2017 103 472 A1, a coupling lever is arranged between a release lever and an actuation lever as a component of the actuation lever chain. The actuation lever is coupled to a securing lever in such a way that the coupling lever can be disengaged from the release lever using the actuation lever. The securing lever is a mass inertia lever that is preloaded by a spring. The mass inertia lever counteracts the movement of the actuation lever.

In the event of a crash, the coupling lever is disengaged from the release lever (crash release). This prevents an actuation of the release lever. However, in the end it remains unclear or is not described in detail how the operation of the known motor vehicle lock is restored after the end of the crash. The invention as a whole seeks to remedy this.

SUMMARY OF DISCLOSURE

The invention is based on the technical problem of further developing such a motor vehicle lock and in particular a motor vehicle door lock in such a way that perfect functionality is observed both in the event of a crash and subsequently, taking into account a structurally simple structure.

To solve this technical problem, a generic motor vehicle lock and in particular a motor vehicle door lock is characterized within the scope of the invention in that the spring acting on the mass inertia element is designed to be double-acting, with a crash spring part and an engaging spring part.

In general, the mass inertia element is rotatably connected to the actuation lever with the interposition of the spring. The actuation lever may advantageously be an external actuation lever. In most cases, a bearing pin that passes through the actuation lever is provided for the rotatable mounting of the mass inertia element.

In order to equip the spring as a whole with a double-acting crash spring part and an engaging spring part, the general procedure is that the spring with a first winding portion as a crash spring part engages around the aforementioned bearing pin for mounting the mass inertia element on the actuation lever. The crash spring part generally ensures that the mass inertia element is held in a predetermined position relative to the actuation lever during normal operation. In contrast, the crash spring part of the double-acting spring is usually deformed in the event of a crash.

In contrast, the engaging spring part of the double-acting spring is preloaded towards a locking position of the mass inertia element. These locking positions of the mass inertia element are generally assumed relative to the coupling element. This means that as a result of the crash, the mass inertia element is temporarily locked to the coupling element by the engaging spring part of the spring.

In fact, when the associated motor vehicle is in operation, the coupling element is usually found in its “disengaged” position, corresponding to the “locked” functional position. The actuation lever chain is interrupted. If a crash occurs, the mass inertia element leaves its predetermined position in normal operation relative to the actuation lever, wherein the crash spring part of the double-acting spring ensures, according to the invention, that the position is maintained in normal operation. In contrast, the crash spring part is deformed in the event of a crash; and the mass inertia element is displaced relative to the actuation lever in the event of a crash. The position of the mass inertia element in the event of a crash generally corresponds to the temporarily-locking connection between the mass inertia element on the one hand and the coupling element on the other. This temporarily-locking connection is facilitated by the engaging spring part as a further component of the double-acting spring. This is because the engaging spring part ensures that the mass inertia element is preloaded in the direction of the locking position of the mass inertia element, specifically in the direction of the temporarily-locking connection between the mass inertia element on the one hand and the coupling element on the other hand in the event of a crash.

As a result of this temporarily-locking connection between the mass inertia element and the coupling element, it is possible according to the invention to open the locking mechanism without any problem, although the coupling element assumes or has assumed its “disengaged” position, without change. In order to open the locking mechanism, it is only necessary to apply one or two tugs to the actuation lever or external actuation lever in order to first unlock and then open the motor vehicle lock according to the invention by appropriately acting on the coupling element, or to realize the unlocking/opening in one go and with one tug. This is because the mass inertia element provides a temporary connection between the actuation lever and the coupling element.

The two-movement opening using the actuation lever is also called a so-called throw-back or ejector function. During the first movement of the actuation lever, the coupling element is transferred to its engaged state, and consequently the motor vehicle lock changes from its “locked” functional state, which it typically assumes during operation, to the “unlocked” functional state. The second movement then ensures the desired opening of the locking mechanism when the motor vehicle lock is unlocked. Of course, this can also be realized and implemented in one go or with one movement.

Either way, the actuation of the coupling element can be realized and implemented easily, without any problems and safely using the mass inertia element that is temporarily connected to the coupling element in the event of a crash. For this purpose, the mass inertia element is rotatably mounted on the actuation lever, which is generally an external actuation lever. Due to the additional double-acting spring with crash spring part and engaging spring part implemented according to the invention, this temporarily-locking connection between the mass inertia element and the coupling element is implemented particularly advantageously and simply.

This is because the crash spring part of the spring holds the mass inertia element in its predetermined position relative to the actuation lever during normal operation. As soon as a crash occurs, the mass inertia element moves while opposing the spring force of the crash spring part. This deforms the crash spring part of the double-acting spring. At the same time, the engaging spring part ensures that the desired temporarily-locking connection between the mass inertia element and the coupling element is established during the crash-related pivoting movement of the mass inertia element, opposing the spring force of the crash spring part. This is because the engaging spring part preloads the mass inertia element in the direction of the locking positions. After the crash has ended, the temporarily-locking connection between the mass inertia element and the coupling element is generally released again, so that the motor vehicle lock according to the invention is back in its initial state. This usually requires that the actuation lever has been actuated first. These are the main advantages.

According to a further advantageous embodiment, the procedure is generally such that the spring forces built up by the crash spring part and the engaging spring part act in different planes. The design is such that the crash spring part provides spring forces in a crash plane and the engaging spring part provides spring forces in a locking plane that runs predominantly vertically. This allows the different functions and forces to be separated from each other particularly effectively and prevents any overlap or malfunction.

According to one embodiment, the mass inertia element is a mass inertia lever with a passage opening for a U-shaped spring arm as an engaging spring part. In this case, the U-shaped spring arm acts as a locking element, which provides the temporarily-locking connection between the mass inertia element and the coupling element.

In another variant of the invention, the mass inertia element is designed in multiple parts, and in particular in two parts. In this case, the mass inertia element has a first mass inertia lever and a second mass inertia lever rotatably connected to the actuation lever. The first mass inertia lever is equipped with a second winding portion as an engaging spring part.

As already explained above, the double-acting spring used according to the invention for loading the mass inertia element has the first winding portion as a crash spring part, which engages around the bearing pin for mounting the mass inertia element on the actuation lever. This includes the second mass inertia lever in the last-mentioned embodiment. In contrast, the first mass inertia lever is equipped with the second winding portion of the double-acting spring, which therefore functions as an engaging spring part.

As a result, a motor vehicle lock and in particular a motor vehicle door lock is provided which enables particularly reliable operation in a structurally simple manner. During normal operation, the motor vehicle lock in question always remains in the “locked” state. In the event of a crash, the mass inertia element is temporarily connected to the coupling element in a locking manner. This allows the coupling element that is disengaged during normal operation to be engaged and the associated locking mechanism to be opened. This is achieved by a two-movement action on the actuation lever in the manner of a recoil or ejector function. Alternatively, a single-movement operation of the actuation lever is also possible in such a way that during this one movement the coupling element is first engaged and then or simultaneously the locking mechanism is opened.

All of this can be implemented particularly easily and intuitively, with the double-acting spring acting on the mass inertia element advantageously supporting the functionalities described. The crash spring part of the spring holds the mass inertia element in position during normal operation and provides a spring force that must be overcome by the mass inertia element in the event of a crash. The engaging spring part supports the subsequent temporary locking between the mass inertia element and the coupling element. These are the main advantages.

BRIEF DESCRIPTION OF DRAWINGS

In the following, the invention is explained in more detail with the aid of a drawing showing only an exemplary embodiment; in the figures.

DETAILED DESCRIPTION

Figure 1:
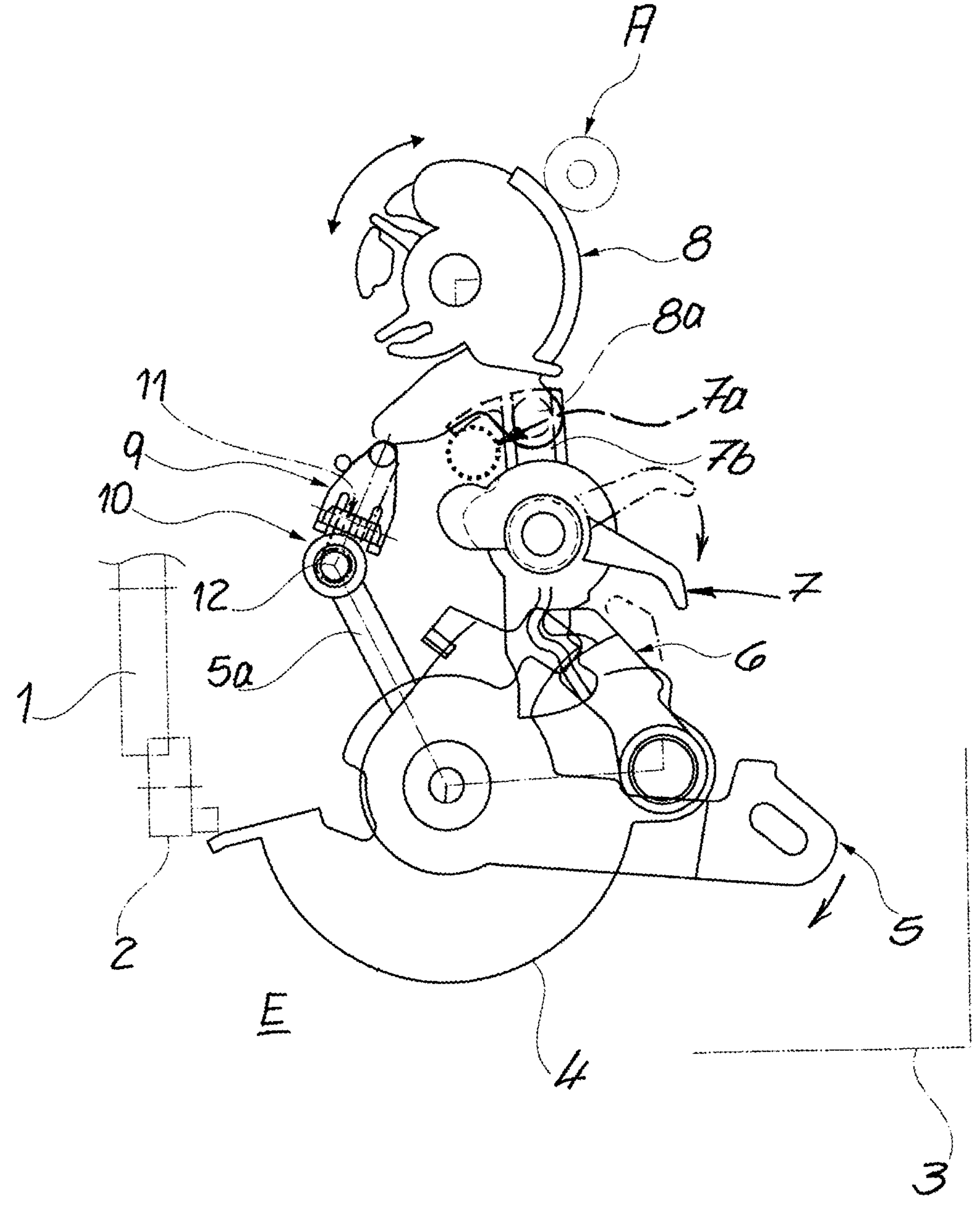
FIG. 1 shows a basic overview of the motor vehicle lock according to the invention.

The drawings show a motor vehicle lock which is not limited to a motor vehicle door lock. It has a locking mechanism 1, 2, which is only indicated in FIG. 1, consisting substantially of a rotary latch 1 and a pawl 2. It can be seen from FIG. 1 that the locking mechanism 1, 2 is arranged substantially perpendicular to the drawing plane shown in the figures. The drawing plane coincides with a plane E spanned by a housing or lock housing 3, which is a crash plane E to be described below.

The basic structure includes at least one actuation lever chain 4, 5, 6, 7, 8 for the locking mechanism 1, 2. The actuation lever chain 4, 5, 6, 7, 8 is equipped with at least one actuation lever 5 and one coupling element 7. According to the exemplary embodiment, without indicating a limitation, the actuation lever 5 is an external actuation lever 5. In addition, the actuation lever chain 4, 5, 6, 7, 8 also has a release lever 4. Furthermore, it has a locking lever 8. Furthermore, the locking lever 8 may be associated with an electric motor drive A, which is not expressly shown and is merely indicated, with the aid of which the locking lever 8 can perform the pivoting movements indicated in FIG. 1 about its axis in the counterclockwise and clockwise directions. In the embodiment, the coupling element 7 functions as a transmission lever. Namely, it ensures a mechanical coupling between the locking lever 8 and a coupling lever 6 as a further component of the actuation lever chain 4, 5, 6, 7, 8. In fact, the coupling lever 6 in question is rotatably mounted on the release lever 4 and is interposed between the actuation lever 5 and the release lever 4.

The basic structure also includes a mass inertia element 9, 10 which acts on the coupling element 7 at least in the event of a crash. For this purpose and according to the embodiment, the mass inertia element 9, 10 performs a combined pivoting/lifting movement and thereby engages in a locking manner in the coupling element 7, specifically in a locking region 7*a* there. The combined pivoting/lifting movement of the mass inertia element 9, 10 manifests itself in such a way that the mass inertia element 9, 10 according to the embodiment not only performs or can perform movements in the plane or crash plane E spanned by the lock housing 3 (and coinciding with the plane of the drawing), but also perpendicularly thereto in a locking plane R.

Figure 2A:
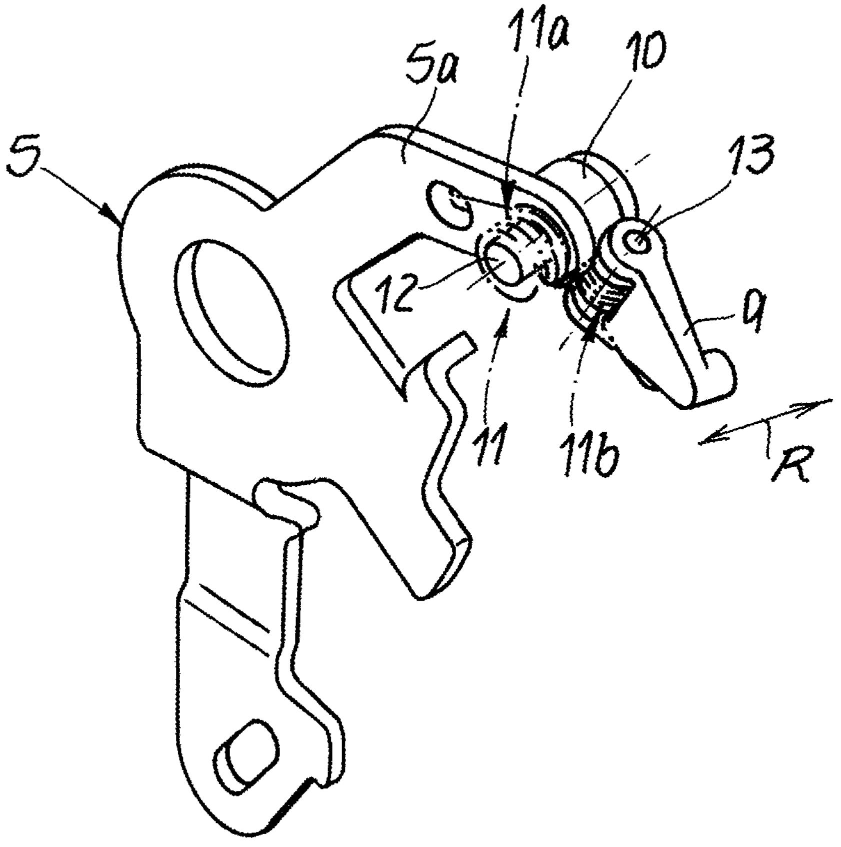
FIGS. 2A and 2B show the actuation lever in a first variant (FIG. 2A) and a second variant (FIG. 2B)

For this purpose, the mass inertia element 9, 10 is connected to an arm 5A of the actuation lever 5. In addition, it can be seen that a spring 11 acting on the mass inertia element 9, 10 is included. The actuation lever or external actuation lever 5 is shown together with the mass inertia element 9, 10 in FIGS. 2A and 2B in two different variants, which will be discussed in more detail below. In addition, the spring 11 can be seen in the figures in question.

According to the invention, the spring 11 for acting on the mass inertia element 9, 10 is designed to be double-acting with a crash spring part 11*a* and an engaging spring part 11*b*. The two variants according to FIGS. 2A and 2B make it clear that the mass inertia element 9, 10 is rotatably connected to the actuation lever 5 in question with the spring 11 interposed. For this purpose, a bearing pin 12 is provided which passes through the actuation lever 5. It can be seen that the spring 11 acting on the mass inertia element 9, 10 surrounds or encircles the bearing pin 12 in question with a first winding portion 11*a* as a crash spring part 11*a*. In the variant according to FIG. 2A or 3, the spring 11 is further equipped with a second winding portion 11*b* as an engaging spring part 11*b*. This includes the first embodiment with a first mass inertia lever 9 and a further second mass inertia lever 10.

Figure 2B:
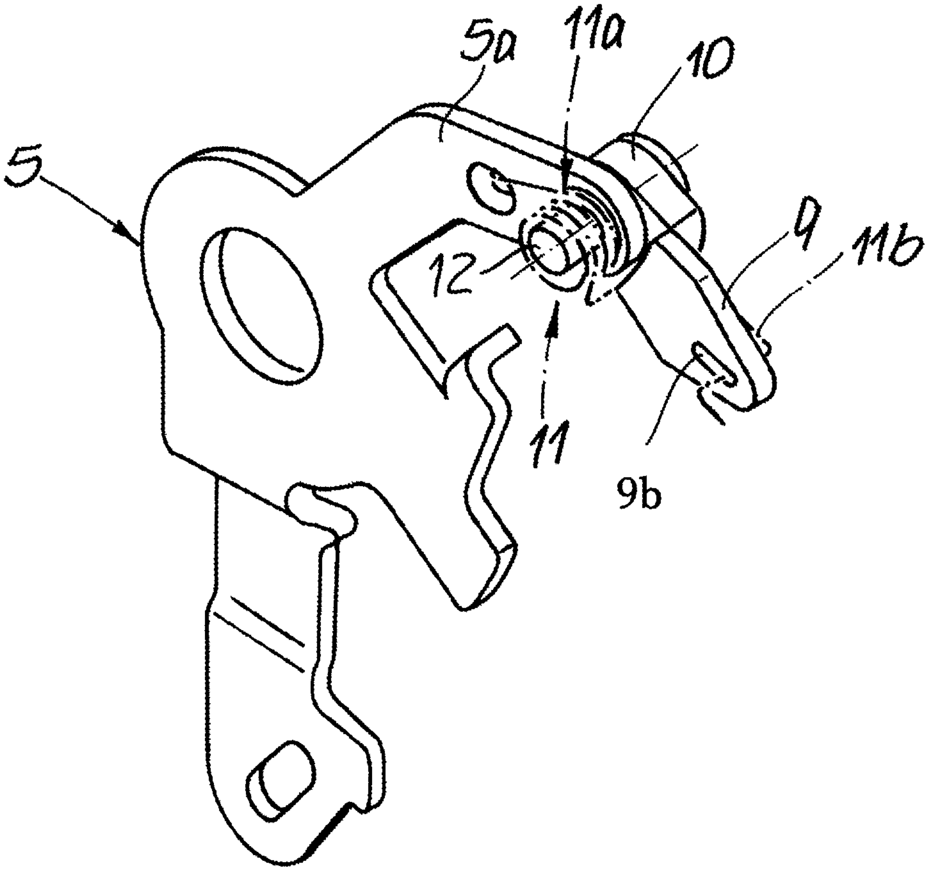
Figure 5:
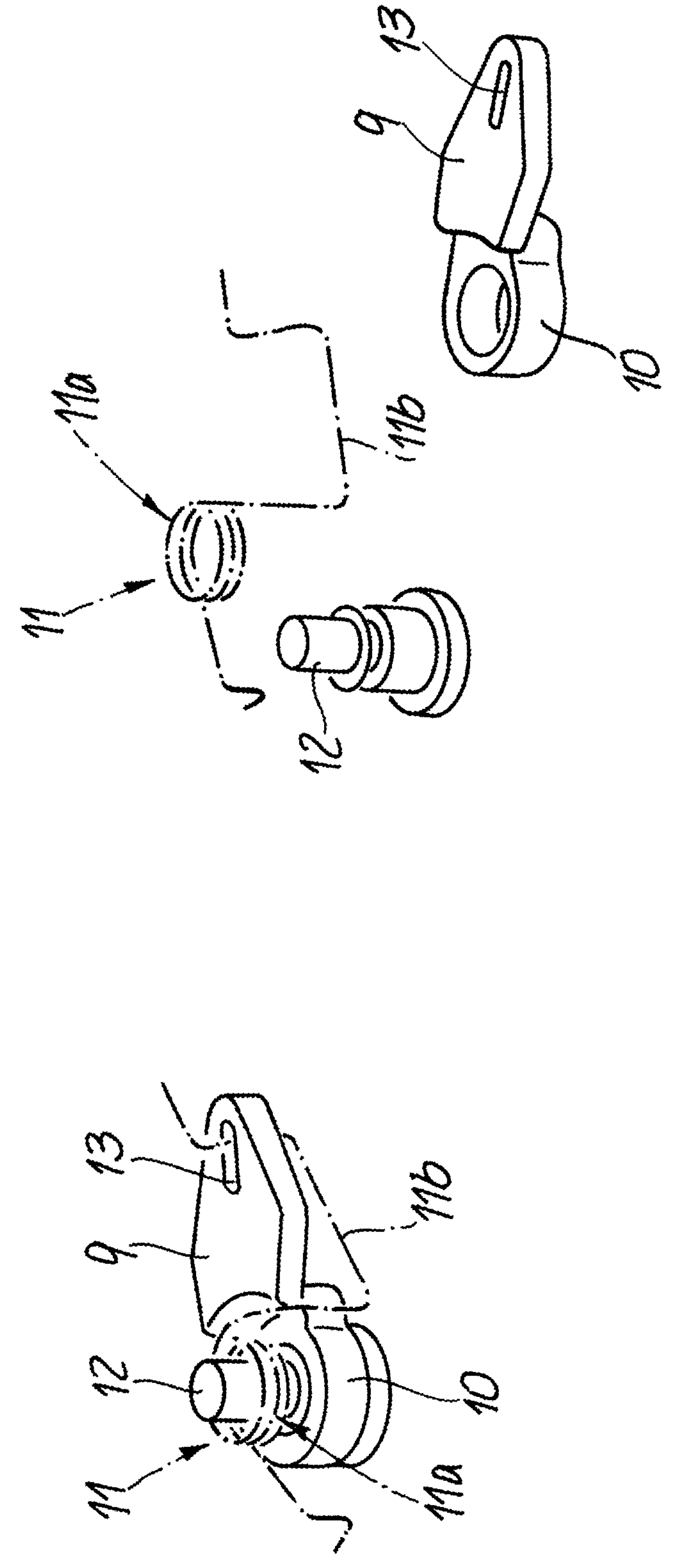
FIG. 5 shows the mass inertia element in a further second variant, partially in exploded view.

In the further second variant according to the illustration in FIGS. 2B and 5, the first winding portion or the crash spring part 11*a* is again included. In contrast, in this variant the engaging spring part 11*b* of the spring 11 is designed as a U-shaped spring arm 11*b*. In this case, a two-part but one-piece mass inertia lever 9, 10 is realized. This has a front lever arm 9 with a passage opening 9*b* for the U-shaped spring arm 11*b* and a further lever arm 10 for the rotatable mounting of the mass inertia element or mass inertia lever 9, 10 on the associated bearing pin 12 in the second variant.

In both design variants, the crash spring part 11*a* ensures that the mass inertia element 9, 10 maintains a predetermined position relative to the actuation lever 5 during normal operation, and is deformed in the event of a crash. For example, this normal operation is shown in solid lines in FIG. 4A for the first embodiment and in FIG. 6A for the second embodiment, whereas the event of a crash corresponds to the dash-dotted and deflected position of the associated mass inertia element 9, 10. It can be seen that the crash spring part 11*a* holds the mass inertia element 9, 10 in the predetermined position relative to the actuation lever 5 in the solid-line normal operation.

This predetermined position of the mass inertia element 9, 10 relative to the actuation lever 5 corresponds to the fact that the mass inertia element 9, 10 cannot interact with the locking region 7*a* of the coupling element 7. In fact, the coupling element 7 not only has the locking region 7*a* in question for a temporary coupling with the mass inertia element 9, 10, but also, a pin receptacle 7*b* of the coupling element 7 is realized, into which the locking lever 8 engages or can engage with a pin 8*a*. The pin receptacle 7*b* is arranged adjacent to the locking region 7*a* of the coupling element 7 (see FIG. 1).

In this way, actuation of the locking lever 8 by means of the drive A, starting from a "locked" position indicated in FIG. 1, in a clockwise direction of the coupling element 7, results in the coupling lever 6 being transferred from its raised position belonging to the unlocked position into the coupled position according to FIG. 1.

Figure 4A:
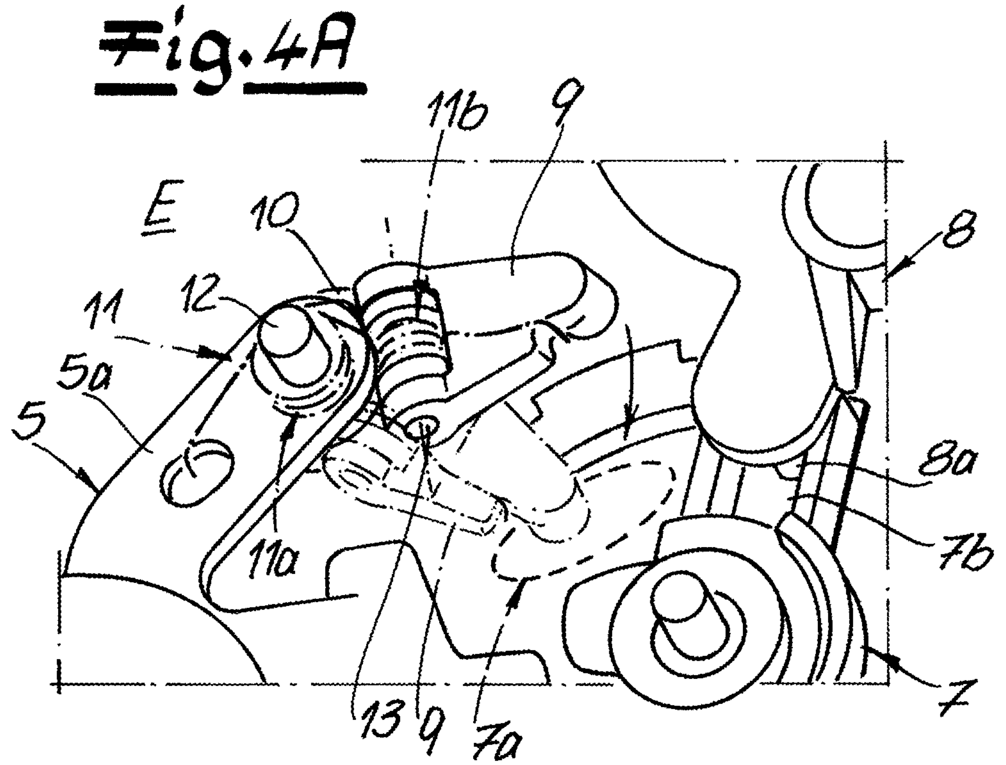
FIGS. 4A and 4B show the event of a crash, illustrating the mass inertia element of the first variant.
Figure 6A:
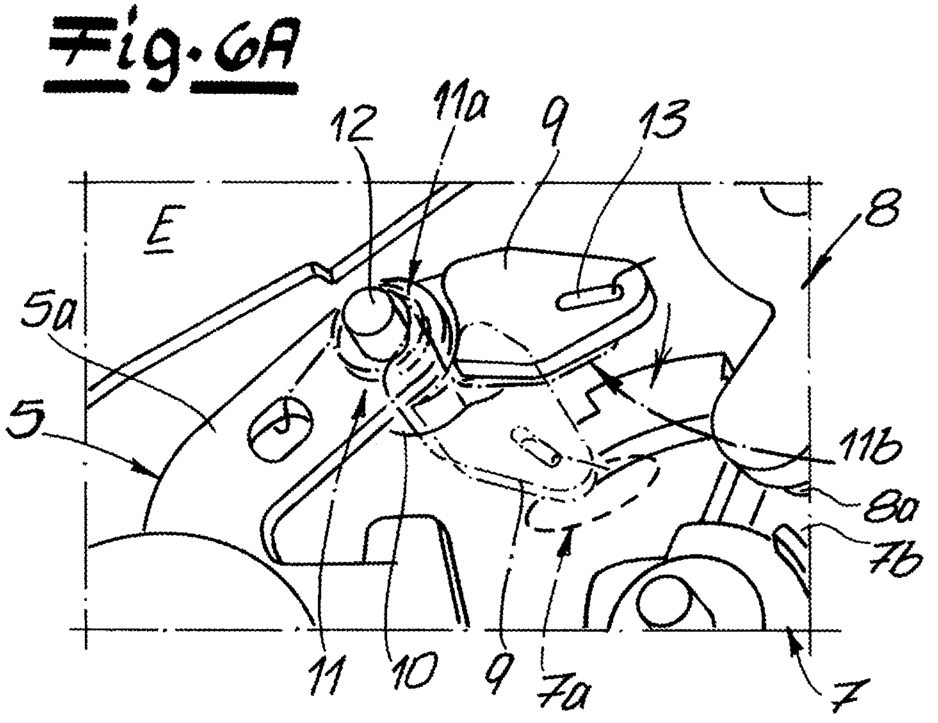
FIGS. 6A and 6B show the event of a crash, illustrating the mass inertia element according to the second variant.

Either way, the transition of the mass inertia element 9, 10 from its position shown in solid lines in FIGS. 4A and 6A to the crash position shown in dash-dotted lines corresponds to the mass inertia element 9, 10 being temporarily coupled to the coupling element 7, namely to the locking region 7*a* of the coupling element 7. For this purpose, the already mentioned engaging spring part 11*b*, as a further component of the double-acting spring 11, ensures that the mass inertia element 9, 10 is acted upon in the direction of the locking positions 7*a* of the mass inertia element 9, 10 with respect to the coupling element 7. In order to achieve this, the spring forces generated by the crash spring part 11*a* on the one hand and the engaging spring part 11*b* on the other hand act in different planes. In fact, the crash spring part 11*a* predominantly builds up spring forces in the drawing plane or the plane coinciding with the lock housing 3 or crash plane E. In contrast, forces generated by the engaging spring part 11*b* correspond to those which run perpendicularly thereto. The spring forces built up by the crash spring part 11*a* therefore run in the crash plane E, which coincides with the plane E, while the engaging spring part 11*b* provides spring forces in the locking plane R, which runs predominantly vertically.

Figure 3:
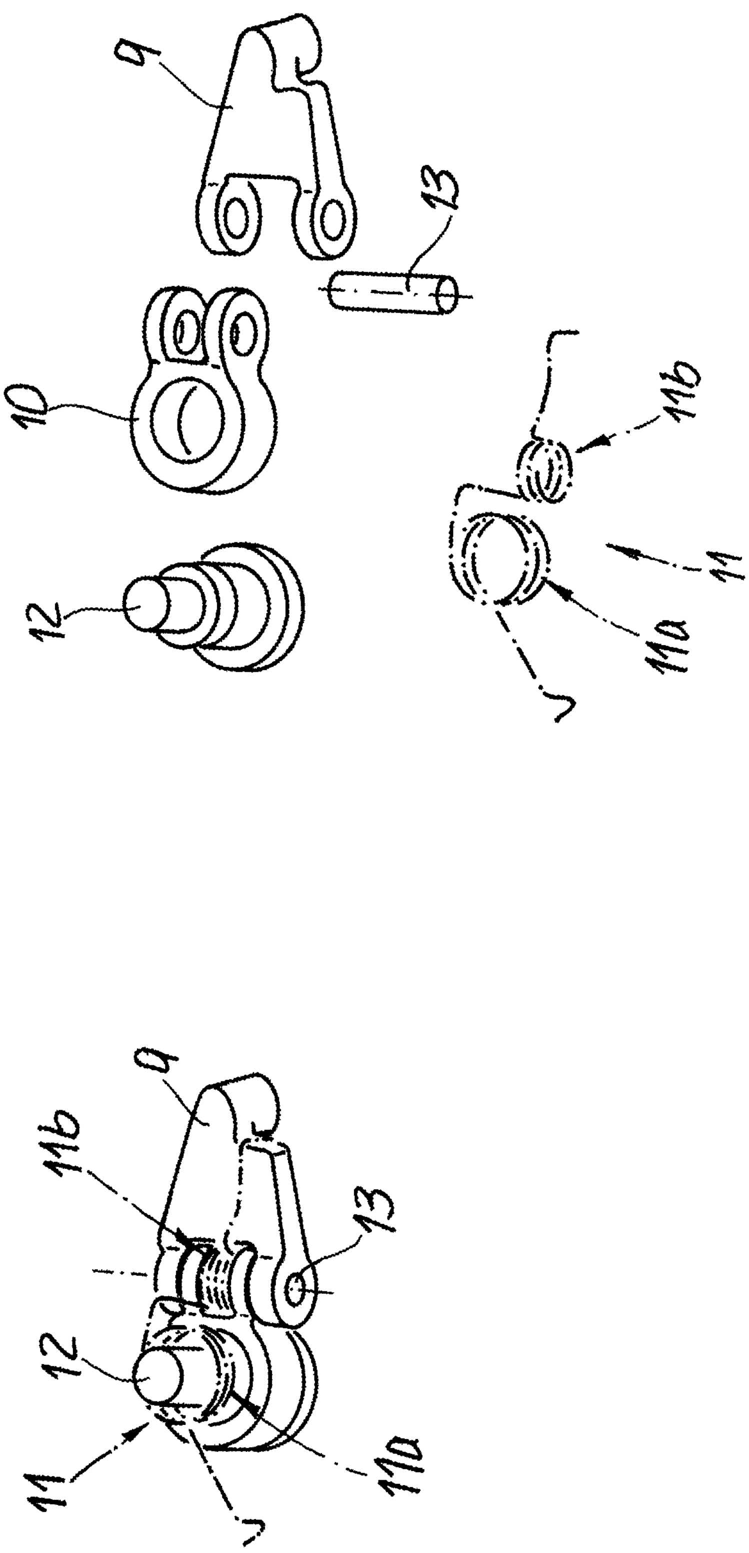
FIG. 3 shows the mass inertia element in the first variant, partly in exploded view.
Figure 4B:
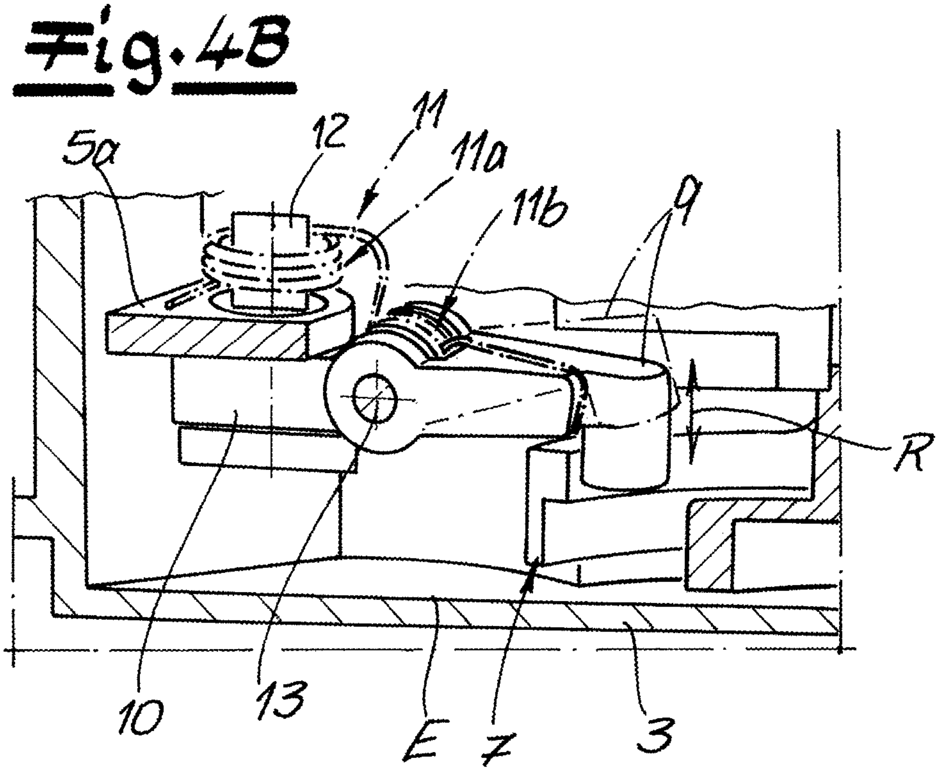

From the illustration in FIGS. 3 and 4A, 4B it can be seen that the mass inertia element 9, 10 in the first variant is designed as a first mass inertia lever 9 and a second mass inertia lever 10 rotatably connected to the actuation lever 5. The first mass inertia lever 9 is equipped with the second winding portion 11*b* and/or the engaging spring part 11*b*. It can be seen that the first mass inertia lever 9 is connected to the second mass inertia lever 10 via an axis 13 which is arranged predominantly in the crash plane or plane E. In fact, this axis 13 is provided by a bearing pin or dowel pin running in the crash plane or plane E in question. In contrast, the second mass inertia lever 10 ensures the mounting of the mass inertia element 9, 10 in this first variant perpendicular to the crash plane in question or plane E.

Figure 6B:
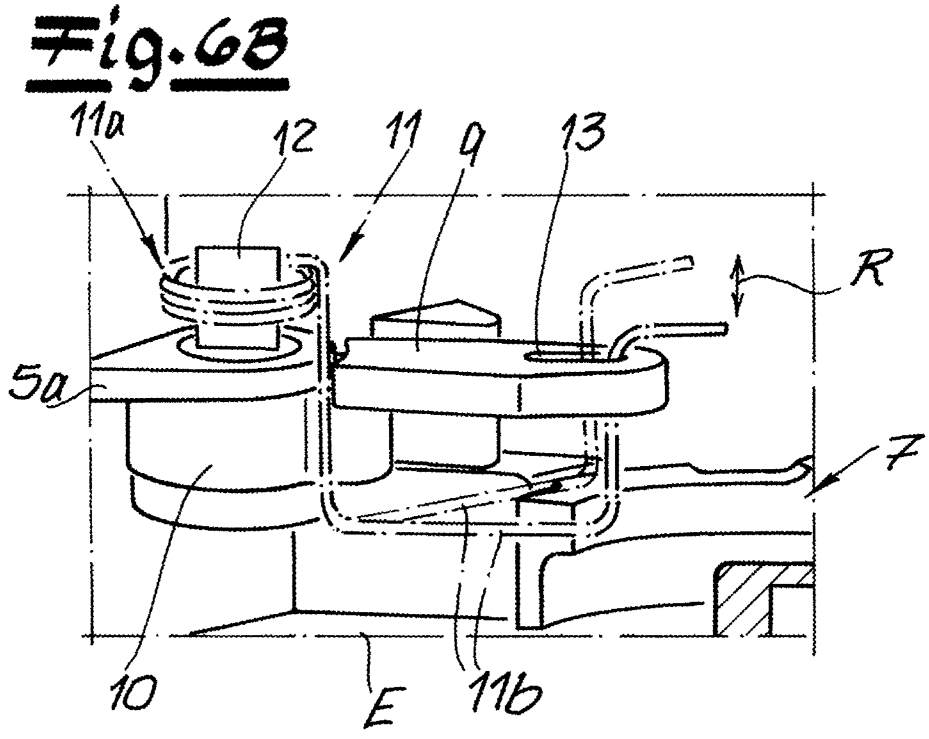

In the second variant according to FIGS. 5 and 6A, 6B, however, the first or front-end lever arm 9 ensures the pivoting movements in the crash plane or plane E, namely about the axis defined by the bearing pin 12. For this purpose, the second lever arm 10 provides a corresponding bearing aperture for the passage of the bearing pin 12.

When comparing FIGS. 4A and 4B or 6A and 6B, it can be seen that in the event of a crash, the mass inertia element 9, 10 not only predominantly performs a pivoting movement in the crash plane or plane E. Rather, the engaging spring part 11*b* of the double-acting spring 11 ensures during this pivoting process or subsequently thereto that the mass inertia element 9, 10 also performs a lifting or lowering movement in the locking plane R. In fact, the mass inertia element 9, 10 is preloaded by means of the engaging spring part 11*b* in the direction of the locking positions 7*a* on the coupling element 7. As a result, the mass inertia element 9, 10 or the first mass inertia lever 9 in the first variant or the front-end lever arm 9 in the second variant each perform a lowering movement in the direction of the locking position 7*a* of the coupling element 7, which can be understood in particular from FIGS. 4B and 6B. Following this, the mass inertia element 9, 10 has assumed a temporary locking position with respect to the coupling element 7.

As a result, the actuation lever 5 is coupled to the coupling element 7 in a detachable, locking manner—and temporarily. In this case, the coupling element 7 typically assumes its disengaged position and the motor vehicle lock according to the invention remains unchanged in its "locked" position. If the actuation lever 5 is then actuated clockwise from this locking position and in accordance with the illustration in FIGS. 2A and 2B and 1, this actuation of the actuation lever 5 during a first movement leads to the coupling element 7 being pivoted clockwise about its axis by this first movement due to the locking coupling of the actuation lever 5 with the coupling element 7. This clockwise movement of the coupling element 7 results in the coupling element 7 being engaged and thereby moving the coupling lever 6 into the engaged position. Now the actuation lever 5 and the release lever 4 are mechanically connected to one another by the engaged coupling lever 6, so that a further second movement of the actuation lever 5 in a clockwise direction results in the locking mechanism 1, 2 being able to be opened.

Instead of a two-movement operation of the actuation lever 5 to the effect of first unlocking and then opening, it is of course also conceivable and within the scope of the invention to be able to realize and implement a combined unlocking and opening with one movement of the actuation lever 5 in one go. In general, there is also the possibility that the mass inertia element 9, 10 acts directly on the locking lever 8 and does not act indirectly on the locking lever 8 via the coupling element 7. In this case, no locking positions 7*a* are provided on the coupling element 7; rather, a locking position 7*a* is provided directly on the locking lever 8, which is then, however, unlocked again before the locking mechanism 1, 2 can be opened.

LIST OF REFERENCE SIGNS

Locking mechanism 1, 2
Rotary latch 1
Pawl 2
Lock housing 3
Actuation lever chain 4, 5, 6, 7, 8
Release lever 4
Actuation lever 5
Extension 5*a*
Coupling lever 6
Coupling element 7
Locking region 7*a*
Pin receptacle 7*b*
Locking lever 8
Pin 8*a*
Mass inertia element 9, 10
Mass inertia lever 9, 10
Spring 11
Winding portion 11*a*
Crash spring part 11*a*
Engaging spring part 11*b*
Spring arm 11*a*, 11*b*
Winding portion 11*b*
Bearing pin 12
Axis 13
Drive A
Plane E

The invention claimed is:

1. A motor vehicle lock comprising:
a locking mechanism,
an actuation lever chain for the locking mechanism, the actuation lever chain having at least one actuation lever and a coupling element,
a mass inertia element which acts on the coupling element at least in the event of a crash, and
a spring acting on the mass inertia element,
wherein the spring is double-acting that comprises a crash spring part that holds the mass inertia element in a predetermined position relative to the actuation lever and an engaging spring part that preloads the mass inertia element toward a locking position, and wherein the coupling element comprises a locking region for a temporary coupling of the mass inertia element during a crash, and a pin receptacle for receiving a locking lever of the actuation lever chain.

2. The motor vehicle lock according to claim 1, wherein the mass inertia element is rotatably connected to the actuation lever with the interposition of the spring.

3. The motor vehicle lock according to claim 2, further comprising a bearing pin passing through the actuation lever for the rotatable connection of the mass inertia element.

4. The motor vehicle lock according to claim 3, wherein the crash spring part of the spring engages around the bearing pin with a first winding portion.

5. The motor vehicle lock according to claim 1, wherein the crash spring part holds the mass inertia element in the predetermined position relative to the actuation lever during a normal operation, and the crash spring part is deformed in the event of a crash.

6. The motor vehicle lock according to claim 1, wherein the engaging spring part is preloaded in a direction of a locking position of the mass inertia element.

7. The motor vehicle lock according to claim 1, wherein spring forces built up by the crash spring part and the engaging spring part act in different planes.

8. The motor vehicle lock according to claim 1, wherein the crash spring part provides spring forces in a crash plane and the engaging spring part provides spring forces in a locking plane which runs perpendicularly relative to the crash plane.

9. The motor vehicle lock according to claim 1, wherein the mass inertia element comprises a mass inertia lever with a passage opening for receiving a U-shaped spring arm as the engaging spring part.

10. The motor vehicle lock according to claim 9, wherein the crash spring part comprises a wind portion for rotatably connecting the mass inertia element to the actuation lever.

11. The motor vehicle lock according to claim 1, wherein the mass inertia element has a first mass inertia lever and a second mass inertia lever, wherein the second mass inertia lever is rotatably connected to the actuation lever, and wherein the first mass inertia lever is equipped with a winding portion as the engaging spring part.

12. The motor vehicle lock according to claim 1, wherein the crash spring part comprises a first winding portion and the engaging spring part comprises a second winding portion.

13. The motor vehicle lock according to claim 1, wherein during a crash the engaging spring part temporarily locks the mass inertia element to the coupling element.

14. The motor vehicle lock according to claim 1, wherein the mass inertia element is connected to an arm of the actuation lever.

15. A motor vehicle lock comprising:

a locking mechanism, an actuation lever chain for the locking mechanism, the actuation lever chain having at least one actuation lever and a coupling element, a mass inertia element which acts on the coupling element at least in the event of a crash, and a spring acting on the mass inertia element, wherein the spring is double-acting that comprises a crash spring part that holds the mass inertia element in a predetermined position relative to the actuation lever and an engaging spring part that preloads the mass inertia element toward a locking position, and wherein the mass inertia element has a first mass inertia lever and a second mass inertia lever, wherein the second mass inertia lever is rotatably connected to the actuation lever, and wherein the first mass inertia lever is equipped with a winding portion as the engaging spring part.

16. A motor vehicle lock comprising:

a locking mechanism, an actuation lever chain for the locking mechanism, the actuation lever chain having at least one actuation lever and a coupling element, a mass inertia element which acts on the coupling element at least in the event of a crash, and a spring acting on the mass inertia element, wherein the spring is double-acting that comprises a crash spring part that holds the mass inertia element in a predetermined position relative to the actuation lever and an engaging spring part that preloads the mass inertia element toward a locking position, wherein the mass inertia element is rotatably connected to the actuation lever with the interposition of the spring, further comprising a bearing pin passing through the actuation lever for the rotatable connection of the mass inertia element, and wherein the crash spring part of the spring engages around the bearing pin with a first winding portion.

* * * * *